United States Patent
Cao et al.

(10) Patent No.: US 10,802,596 B2
(45) Date of Patent: Oct. 13, 2020

(54) DISPLAY DEVICE, SELF-LUMINOUS DISPLAY PANEL AND GESTURE RECOGNITION METHOD

(71) Applicant: BOE TECHNOLOGY GROUP CO., LTD., Beijing (CN)

(72) Inventors: Xueyou Cao, Beijing (CN); Xue Dong, Beijing (CN); Haisheng Wang, Beijing (CN); Xiaoliang Ding, Beijing (CN); Chih Jen Cheng, Beijing (CN); Pengpeng Wang, Beijing (CN); Wei Liu, Beijing (CN); Yanling Han, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 204 days.

(21) Appl. No.: 15/996,953

(22) Filed: Jun. 4, 2018

(65) Prior Publication Data

US 2019/0033976 A1 Jan. 31, 2019

(30) Foreign Application Priority Data

Jul. 31, 2017 (CN) .......................... 2017 1 0638929

(51) Int. Cl.
*G06F 3/01* (2006.01)
*G06F 3/0488* (2013.01)
*G06F 3/041* (2006.01)
*G06F 1/16* (2006.01)
*H04N 5/232* (2006.01)
(Continued)

(52) U.S. Cl.
CPC ............ *G06F 3/017* (2013.01); *G06F 1/1605* (2013.01); *G06F 1/1637* (2013.01);
(Continued)

(58) Field of Classification Search
CPC ........ G06F 3/017; G06F 3/0304; G06F 3/005; G06F 1/1686; G02F 1/136209;
(Continued)

(56) References Cited

U.S. PATENT DOCUMENTS 5,594,469 A * 1/1997 Freeman ................. G06F 3/017
345/158
9,501,686 B2 11/2016 Lin
(Continued)

FOREIGN PATENT DOCUMENTS

CN 104319283 A 1/2015
CN 105045399 A 11/2015
(Continued)

OTHER PUBLICATIONS

Chinese Office Action dated Sep. 23, 2019.

*Primary Examiner* — Dong Hui Liang
(74) *Attorney, Agent, or Firm* — Dilworth & Barrese, LLP.; Michael J. Musella, Esq.

(57) ABSTRACT

A display device, a self-luminous display panel and a gesture recognition method are provided. The display device includes a self-luminous display panel, an infrared light source, at least one camera device, and an image processing device. The image processing device is coupled to the at least one camera device and configured to perform gesture recognition based on a plurality of successive infrared images and a plurality of successive visible light images of an operation body taken within a same period of time.

13 Claims, 5 Drawing Sheets

(51) Int. Cl.
*G06K 9/00* (2006.01)
*G06F 3/042* (2006.01)
*G06K 9/62* (2006.01)
*H04N 5/33* (2006.01)
*G06K 9/20* (2006.01)
*G09G 3/20* (2006.01)
*G06F 3/03* (2006.01)

(52) U.S. Cl.
CPC .......... *G06F 1/1684* (2013.01); *G06F 1/1686* (2013.01); *G06F 3/0304* (2013.01); *G06F 3/0412* (2013.01); *G06F 3/0416* (2013.01); *G06F 3/0425* (2013.01); *G06F 3/04883* (2013.01); *G06K 9/0004* (2013.01); *G06K 9/0008* (2013.01); *G06K 9/00355* (2013.01); *G06K 9/209* (2013.01); *G06K 9/6293* (2013.01); *G09G 3/2003* (2013.01); *H04N 5/23229* (2013.01); *H04N 5/33* (2013.01); G09G 2300/0452 (2013.01); G09G 2320/0295 (2013.01)

(58) Field of Classification Search
CPC ............ G02F 1/133512; G09G 3/3648; G09G 2300/0452; G09G 2300/0809
See application file for complete search history.

(56) References Cited

U.S. PATENT DOCUMENTS

| | | | |
|---|---|---|---|
| 9,767,741 | B2 | 9/2017 | Bai et al. |
| 2010/0225616 | A1* | 9/2010 | Kiyose .................. G06F 3/0412 345/175 |
| 2012/0176298 | A1* | 7/2012 | Suh ...................... H01L 27/3234 345/82 |
| 2015/0206931 | A1* | 7/2015 | Choi .................... H01L 29/7869 257/72 |
| 2015/0242056 | A1* | 8/2015 | Hoffman ............... G06F 3/0412 345/175 |
| 2015/0256813 | A1* | 9/2015 | Dal Mutto ........... H04N 13/254 348/47 |
| 2016/0033822 | A1* | 2/2016 | Jiang .................. G02F 1/13338 349/33 |
| 2019/0056613 | A1 | 2/2019 | Wang et al. |

FOREIGN PATENT DOCUMENTS

| | | |
|---|---|---|
| CN | 105304656 A | 2/2016 |
| CN | 106653802 A | 5/2017 |
| CN | 106773219 A | 5/2017 |
| KR | 1020170037436 A | 4/2017 |

* cited by examiner

| obtaining, by a display device, a plurality of successive infrared images of a hand taken by a camera device in the display device within a preset period of time. | 601 |

↓

| obtaining, by the display device, a plurality of successive visible light images of the hand taken by the camera device in the display device within the preset period of time. | 602 |

↓

| performing, by the display device, gesture recognition based on the plurality of successive infrared images and the plurality of successive visible light images of the hand. | 603 |

DISPLAY DEVICE, SELF-LUMINOUS DISPLAY PANEL AND GESTURE RECOGNITION METHOD

CROSS REFERENCE TO RELATED APPLICATIONS

This application claims the benefit of Chinese Patent Application No. 201710638929.0 filed on Jul. 31, 2017, the entire disclosure of which is incorporated by reference herein.

TECHNICAL FIELD

The embodiments of the present disclosure relate to a display device, a self-luminous display panel and a gesture recognition method.

BACKGROUND

With the development of science and technology, control methods for display devices are increasingly diversified and gesture control method is one of them. Gesture control means that a display device performs corresponding operations in accordance with gestures of the user of the display device. During gesture control, hands of the user may be out of contact with the display device, which as a result is controlled over the air.

SUMMARY

An embodiment of the present disclosure provides a display device comprising a self-luminous display panel, an infrared light source, at least one camera device, and an image processing device, wherein the display panel has a display surface and a non-display surface that are parallel to each other, the infrared light source is disposed on a side of the display panel on which the non-display surface is located, the light emitting surface of the infrared light source is directed to a side of the display panel on which the display surface is located, and the display panel has a transmissive area for transmission of infrared light; the at least one camera device is directed to the side of the display panel on which the display surface is located, and configured to acquire infrared images and visible light images; and the image processing device is coupled to the at least one camera device and configured to perform gesture recognition based on a plurality of successive infrared images and a plurality of successive visible light images of an operation body taken within a same period of time.

In an example of the display device, the infrared light emitted by the infrared light source forms a reticular optical pattern constituted by transverse stripe optical patterns and longitudinal stripe optical patterns crossing each other on a plane parallel to the display surface of the display panel after being transmitted through the display surface.

In an example of the display device, the at least one camera device is located around the display panel or on the non-display area of the display panel, and the at least one camera device comprises an infrared camera and a visible light camera, which are configured to take a plurality of successive infrared images and a plurality of successive visible light images of the operation body, respectively.

In an example of the display device, the display panel comprises infrared sensors connected with the image processing device; and the image processing device is further configured to obtain intensities, which is detected by the infrared sensors, of the infrared light reflected by a fingerprint to be recognized, and performs recognition on the fingerprint to be recognized based on the intensities.

In an example of the display device, the display panel comprises a plurality of pixels arranged in an array and the transmissive area is constituted by pixel gaps between the plurality of pixels with each pixel comprising at least two sub-pixels spaced apart; and a plurality of infrared sensors are disposed in the display panel with each infrared sensor being located between every two adjacent groups of sub-pixels other than in any pixel gap, and each group of sub-pixels comprises at least two sub-pixels arranged in a row direction.

In an example of the display device, the display panel comprises a plurality of pixels arranged in an array and the transmissive area is constituted by pixel gaps between the plurality of pixels, and the display device further comprises light ray collimators disposed in the pixel gaps to collimate the infrared light emitted from the infrared light source.

In an example of the display device, the display panel comprises a plurality of pixels arranged in an array and a plurality of light shading blocks arranged in an array on the non-display surface.

In an example of the display device, the plurality of light shading blocks are in one to one correspondence with the plurality of pixels, and each of the light shading blocks covers a normal projection area of a corresponding pixel on the non-display surface.

In an example of the display device, the display device comprises a plurality of camera device, the display panel has a rectangular shape, and each of four corners of the display panel has one infrared camera and one visible light camera disposed thereon.

Another embodiment of the present disclosure provides a self-luminous display panel comprising a base substrate, a plurality of light shading blocks and a plurality of pixels, wherein the plurality of light shading blocks are arranged in an array on the base substrate and in one to one correspondence with the plurality of pixels; transmissive pixel gaps are between the plurality of pixels; and each of the pixels is disposed on a corresponding light shading block which covers a normal projection of the pixel on the base substrate.

In an example of the display panel, each of the pixels comprises at least two sub-pixels spaced apart; the display panel has a plurality of infrared sensors disposed therein; and each of the infrared sensors is located between every two adjacent groups of sub-pixels other than any pixel gap, and each group of sub-pixels comprises at least two sub-pixels arranged in a row direction.

Further another embodiment of the present disclosure provides a gesture recognition method comprising: obtaining a plurality of successive infrared images of an operation body that are taken within a preset period of time by a camera device in a display device; obtaining a plurality of successive visible light images of the operation body that are taken within the preset period of time by the camera device in the display device; and performing gesture recognition based on the plurality of successive infrared images and the plurality of visible light images of the operation body.

In an example of the gesture recognition method, performing gesture recognition based on the plurality of successive infrared images and the plurality of visible light images of the operation body comprises: determining a variation of distortion degree, within the preset period of time, of an optical pattern formed by projection of an infrared light source of the display device on the operation body in accordance with the plurality of successive infrared images of the operation body; determining a movement trajectory of the operation body in a direction perpendicular to a reference plane within the preset period of time in accordance with the variation of distortion degree of the optical pattern, wherein where the display panel is a flat display panel, the reference plane is a display surface, while where the display panel is a curved display panel, the reference plane is a plane in which a chord corresponding to a generatrix of the display surface is located; determining the movement trajectory of the operation body in a direction parallel to the reference plane within the preset period of time in accordance with the plurality of successive visible light images of the operation body; and performing gesture recognition in accordance with the movement trajectory in a direction perpendicular to the reference plane and the movement trajectory in the direction parallel to the reference plane of the operation body.

Further still another embodiment of the present disclosure provides a gesture recognition device comprising a processor, a memory and one or more computer program modules, wherein the one or more computer program modules are stored in the memory and configured to be executed by the processor, and comprise instructions, when executed, implementing the above gesture recognition method.

Further still another embodiment of the present disclosure provides a storage medium used for non-temporal storage of computer readable instructions, wherein the non-temporal computer readable instructions can perform the above gesture recognition method when executed by a computer.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In practical application, the gesture control for a display device is increasingly common in people's usual life. The so-called gesture control means that the display device performs corresponding operations in accordance with gestures of the user of the display device (i.e., gestures of a hand of the user). For example, in the computer game of Fruit Ninja Free, the user can make gestures with his hand(s) over the air, such as moving his hand up, down or the like, and the display device can recognize the user's gestures, generate blade image information in the same direction as the gestures based on the user's gestures and display a blade and its movement on the display panel based on the blade image information.

In order to realize gesture control for a display device, the display device typically has an independent gesture recognition device disposed therein, with which the display device can recognize gestures of the user and in turn performs corresponding operations in accordance with the recognized gestures. However, in practical application, the display device having an independent gesture recognition device disposed therein may have a relatively large volume.

For example, in order to realize gesture control, a display device is generally equipped with an transmitter and a receiver for electromagnetic waves (typically millimeter waves); during the operation of gesture control, the electromagnetic wave transmitter transmits electromagnetic waves, the electromagnetic wave receiver receives the electromagnetic waves that are reflected by the user's hand, and the processing device of the display device can obtain the positions of the user's hand relative to the display device in accordance with the time difference between the transmission of the electromagnetic waves by the transmitter and the reception of the electromagnetic waves by the receiver and determine the movement trajectory or path of the user's hand in accordance with the variation of position of the user's hand within a period of time so as to recognize gestures of the user and thus realize gesture control.

In order to perform gesture control, an electromagnetic wave transmitter and an electromagnetic wave receiver that are additionally required result in a relatively large volume of the display device, which does not conform to the current concept and trend of device miniaturization.

Figure 1:
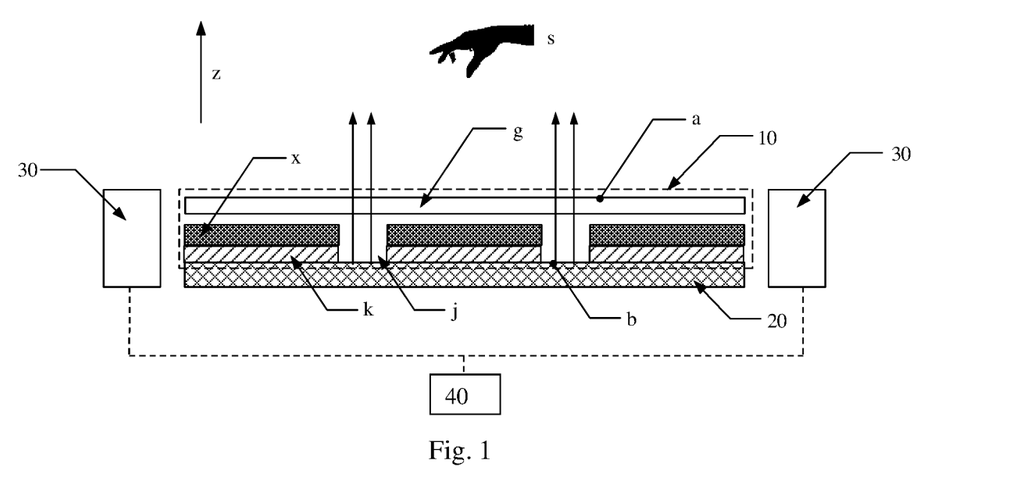
FIG. 1 is a structure diagram of a display device provided in an embodiment of the present disclosure.

An embodiment of the present disclosure provides a display device. FIG. 1 shows a schematic diagram of the display device provided in the present embodiment. As illustrated in FIG. 1, the display device includes a self-luminous display panel 10, an infrared light source 20, at least one camera device 30 and an image processing device 40.

The display panel 10 has a display surface a and a non-display surface b that are parallel to each other. The display surface a of the display panel 10 refers to the surface that displays images for viewers, while the non-display surface b of the display panel 10 refers to the surface that is not used for image display, i.e., one of the two parallel surfaces of the display panel 10 other than the display surface a.

The infrared light source 20 is disposed on the side of the display panel 10 on which the non-display surface b is located, and the light emitting surface of the infrared light source 20 is directed to the side of the display panel 10 on which the display surface a is located. The display panel 10 has a transmissive area for passing-through of infrared light. In practical application, the display panel 10 may include a plurality of pixels x (only three pixels are illustrated in FIG. 1 by way of example) and adjacent pixels x have pixel gaps j therebetween, and the pixel gaps j constitute the above-mentioned transmissive area of the display panel 10. The infrared light emitted by the infrared light source 20 can pass through the transmissive area of display panel 10 (i.e., the pixel gaps j) and impinge on the hand s from the display surface a of the display panel 10. For example, the infrared light source 20 may emit near infrared light, mid-infrared light, far infrared light or the like.

For example, camera devices 30 may be located around the display panel 10 or on the non-display area of the display panel 10.

In the following, the present embodiment will be described in the case that a hand is taken as an operation body, but embodiments of the present disclosure are not limited to this example. For example, in some computer games, the user can operate by means of a joystick, a bat or the like as the operation body, and the display device in the present embodiment can also sense operations of such operation bodies. As used in the present disclosure, maneuver operations by such operation bodies are also covered by the general term "gesture operation".

Figure 8A:
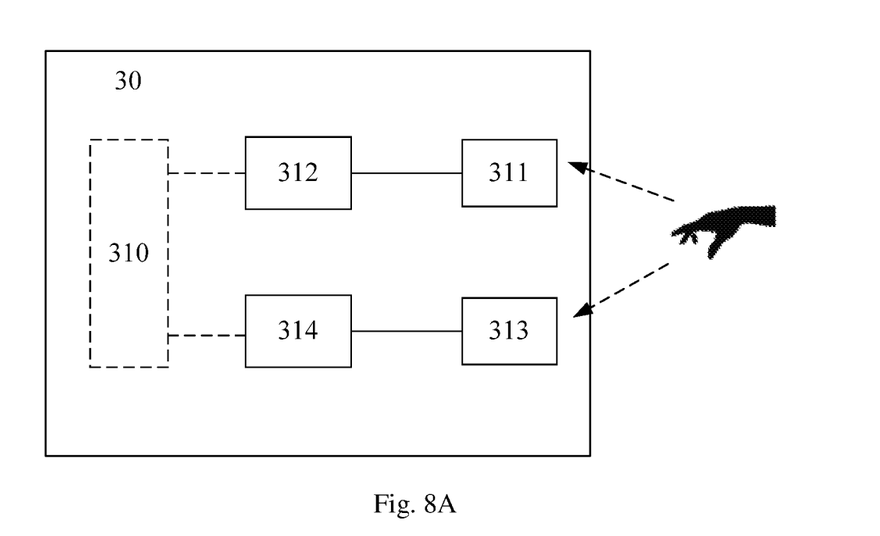
FIGS. 8A and 8B are schematic diagrams illustrating examples of a camera device involved in embodiments of the present disclosure.

In an example, with reference to FIG. 8, the camera device 30 includes an infrared camera and a visible light camera, which are independent from each other. The infrared camera includes an infrared sensor 312 and a lens 311, and the visible light camera includes a visible light sensor 314 and a lens 313. The infrared sensor 312 and the visible light sensor 314 can both be coupled to an image processor 310 (e.g., a digital signal processor (DSP)). The lens 311 of the infrared camera and the lens 313 of the visible light camera are all directed to the side of display panel 10 on which the display surface a is located, so as to acquire images of gesture operations from the side of the display panel on which the display surface a is located. The image processor 310 is connected with and sends acquired (digital) images to a system processor (e.g., the image processing device 40). Alternatively, the infrared sensor 312 and the visible light sensor 314 may both be directly coupled to the image processing device 40.

Figure 8B:
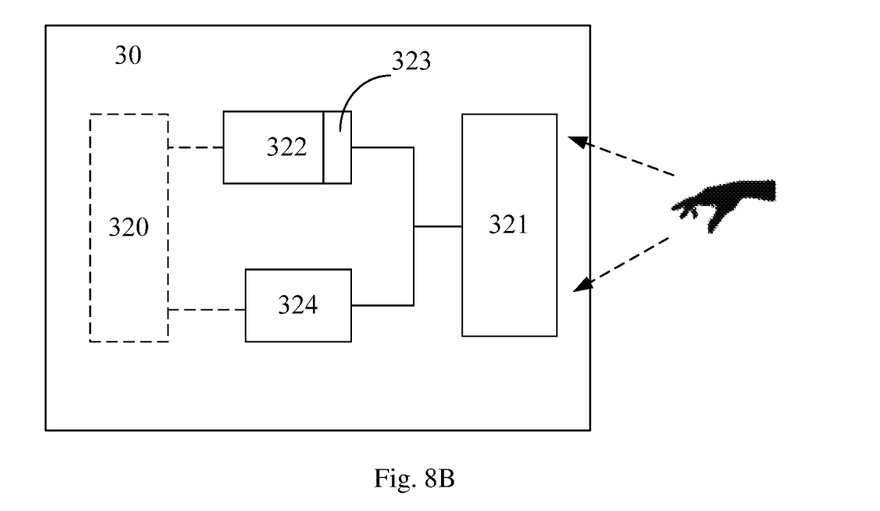

In another example, the camera device 30 is an integrated infrared/visible light camera that includes an infrared sensor 322, a visible light sensor 324 and a lens 321 with the lens 321 collecting light both for the infrared sensor 322 and for the visible light sensor 324, while an infrared filter is disposed before the infrared sensor 322. The infrared sensor 322 and the visible light sensor 324 are all connected to the image processor 310. Alternatively, the infrared sensor 322 and the visible light sensor 324 may both be directly coupled to the image processing device 40.

In an example, the image processing device 40 may be coupled to the infrared camera and the visible light camera of the camera device 30 (e.g., via electrical connection) respectively. The image processing device is capable of recognizing gestures based on a plurality of successive infrared images and a plurality of successive visible light images of the hand that are acquired respectively by the infrared camera and the visible light camera within the same period of time.

In practical application, the self-luminous display panel 10 described above may be an Organic Light-Emitting Diode (OLED) display panel. When the display panel 10 is an OLED display panel, it may further include a glass cover g disposed on the side of the display panel 10 on which the display surface a is located. Furthermore, the infrared light source 20 may be a source of emitting parallel light, which means that the infrared light emitted from the infrared light source 20 is parallel light. In practical application, the infrared light source 20 described above is a modulated light source, which means that the frequency of the infrared light emitted by the infrared light source 20 is modulated according to a preset frequency for example.

Furthermore, it is noted that although two camera devices 30 are illustrated in FIG. 1, in practical application, one camera device 30 or more than two camera devices 30 may be arranged and embodiments of the present disclosure are not limited in this respect.

During gesture recognition, the infrared light source 20 emits infrared light; because the infrared light can transmit only through the pixel gaps j, the reticular optical pattern constituted by transverse stripe optical patterns and longitudinal stripe optical patterns crossing each other can be formed in a plane by the infrared light emitted out of the display surface a of the display panel 10 from the infrared light source 20. When the infrared light emitted from the infrared light source 20 impinges on the hand s through the display surface a of the display panel 10, distortion to some extent may occur to the reticular optical pattern formed on the surface of the hand s by the infrared light due to the typically uneven surface of the hand s. In practical application, the degree of distortion relates to the vertical distance between the hand s and the reference plane of the display panel 10. Generally, the smaller the vertical distance is, the higher the degree of distortion is; the bigger the vertical distance is, the lower the degree of distortion is. When the display panel 10 is a flat display panel, the above-mentioned reference plane is the display surface a or is parallel with the display surface a; when the display panel 10 is a curved display panel (e.g., an arched display panel), the reference plane is the plane in which the chord corresponding to the generatrix of the display surface is located, and thus is tangent to the display surface of the display panel.

In an example that has been described above, the infrared camera in the camera device 30 can take a plurality of successive infrared images of the hand within a preset period of time, and each of the infrared images includes the image of an optical pattern formed on the hand s by the infrared light at a point of time. The infrared camera can send the acquired plurality of successive infrared images of the hand to the image processing device 40; the image processing device 40 obtains the variation of the vertical distance between the hand s and the above-mentioned reference plane within the preset period of time in accordance with the variation of distortion degree of optical patterns in the plurality of successive infrared images of the hand so as to obtain the movement trajectory of the hand s in the direction perpendicular to the reference plane (the z direction as illustrated in FIG. 1).

As described above, in an example, the camera device 30 further includes a visible light camera, which can take a plurality of successive visible light images of the hand within the above-mentioned preset period of time, and each of the visible light images includes the image the hand s at a point of time. The visible light camera can send the acquired plurality of successive visible light images of the hand to the image processing device 40, and the image processing device 40 determines the variation of position of the hand's normal projection on the reference plane, in accordance with the plurality of successive visible light images and based on the principle of binocular distance measurement, so as to obtain the movement trajectory of the hand s in the direction parallel with the reference plane.

It is noted that in order for the image processing device 40 to determine the variation of position of the hand's normal projection on the reference plane in accordance with the plurality of successive visible light images and based on the principle of binocular distance measurement; the visible light camera in the camera device 30 may be a binocular camera, or two camera devices 30 may be disposed in the display device; embodiments of the present disclosure is subject to no limitation in this respect.

It can be seen from the description above that the image processing device 40 can obtain the movement trajectory of the hand s in the direction perpendicular to the reference plane in accordance with a plurality of successive infrared images of the hand s taken by the infrared camera within a preset period of time and can obtain the movement trajectory of the hand s in the direction parallel with the reference plane in accordance with the plurality of successive visible light images of the hand s taken by the visible light camera within the above-mentioned preset period of time; in other words, the image processing device can obtain the movement trajectory of the hand s in the three-dimensional space within the preset period of time. In this way, the movement of the user's hand, i.e., the gesture of the user can be recognized and in turn the display device can be controlled through gestures by providing the infrared light source 20, the camera devices 30 and the image processing device in the display device.

Because a display device usually is provided with a visible light camera for the camera device 30 and an image processing device disposed therein and the infrared light source 20 may be integrated with the display panel 10 of the display device, in embodiments of the present disclosure gesture control can be achieved for the display device while ensuring a relatively small volume of the display device.

In summary, gestures of the user can be recognized and in turn gesture control can be achieved for the display device provided in embodiments of the present disclosure by disposing an infrared light source, at least one camera device and an image processing device in the display device; the infrared light source may be disposed on one side of the display device on which the self-luminous display panel is located, so that the gesture recognition device in the display device may be partially integrated with the display panel of the display device, leading to a reduced volume of the display device.

With further reference to FIG. 1, in at least one example, the display panel 10 includes a plurality of light shading blocks k arranged in an array on the non-display surface b, which are in one to one correspondence with the plurality of pixels x in the display panel 10 and each can cover the normal projection areas of one corresponding pixel x on the non-display surface b of the display panel 10. For example, the light shading blocks k may be fabricated with an opaque material, such as a metallic material, black resin or the like.

The light shading blocks k can ensure that the infrared light emitted from the infrared light source 20 does not transmit through the pixels x in the display panel 10 and thus the display panel 10 can display images as normal.

Figure 2:
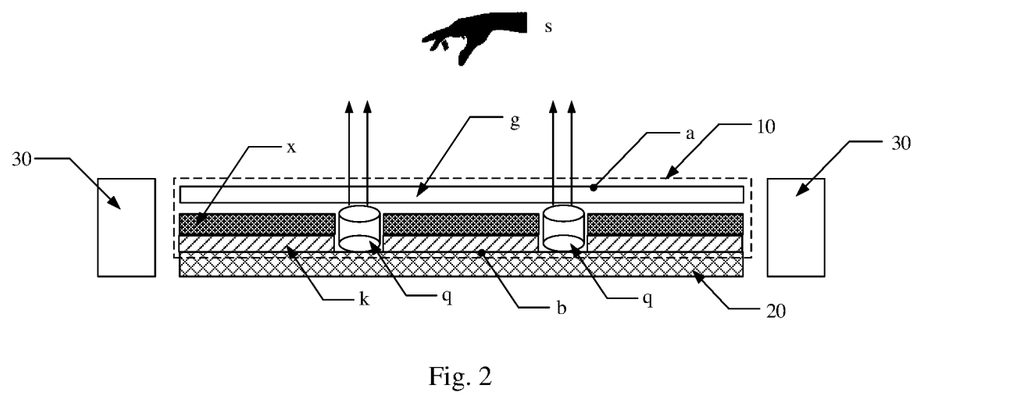
FIG. 2 is a structure diagram of a display device provided in an embodiment of the present disclosure.

With reference to FIG. 2, in the embodiment illustrated in FIG. 2, the display device may further include light ray collimators q that are disposed in the pixel gaps j. For example, the light ray collimator q may be formed by a microlens or an array of microlenses, and the microlens can be fabricated with, for example, photolithography, impression or any other process. The infrared light emitted from the infrared light source 20 can transmit through the light ray collimators q disposed in the pixel gaps j and impinge on the hand s through the display surface a of the display panel 10.

In practical application, the pixel gaps j may be set to be very small, and in this case the infrared light emitted from the infrared light source 20 may interfere or diffract when passing through the pixel gaps j, leading to some distortion of the above-mentioned reticular optical pattern formed by the infrared light and affecting the recognition of the movement trajectory of the hand s. In order to avoid the situation described above, in embodiments of the present disclosure, light ray collimators q are disposed in the pixel gaps j to ensure that the infrared light rays emitted through the light ray collimators q are parallel with each other, preventing recognition of the movement trajectory of the hand from being affected by the phenomenon of interference and diffraction.

Figure 3:
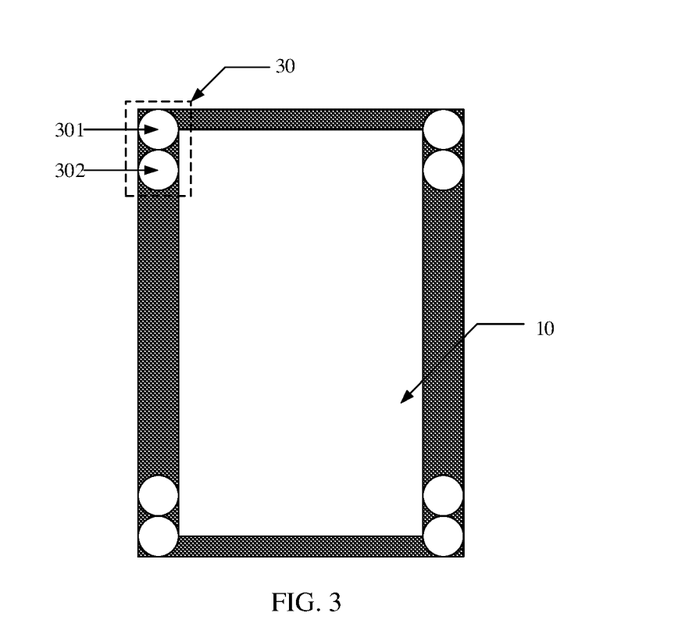
FIG. 3 is a top view of a display device provided in an embodiment of the present disclosure.

Refer to FIG. 3, which shows a top view of the display device illustrated in FIG. 1 or FIG. 2. In FIG. 3, it is assumed that the display panel 10 has a rectangular shape and in this case each of the four corners of the display panel 10 has one camera device 30, i.e., one infrared camera 301 and one visible light camera 302, disposed thereon.

Because the range covered by each camera device 30 is limited, in practical application it is usually difficult for the space in front of the display panel 10 to be covered by a single camera device 30. Therefore, in order for the space in front of the display panel 10 to be completely covered, in the embodiment of the present disclosure, a plurality of camera devices may be disposed in the display device. Furthermore, because the coverage range of the camera device 30 is often of a taper sector, disposing four camera devices 30 on four corners of the display panel 10 respectively can maximally ensure that the display panel 10 is completely covered by their the shooting range.

It is noted that the display panel 10 may have any other shape, such as a circular shape or an elliptical shape, and a plurality of camera devices 30 may be disposed on the peripheral area of the display panel to maximize the shooting range.

In practical application, the display device provided in the embodiment of the present disclosure can further recognize fingerprints in addition to gestures.

Figure 4:
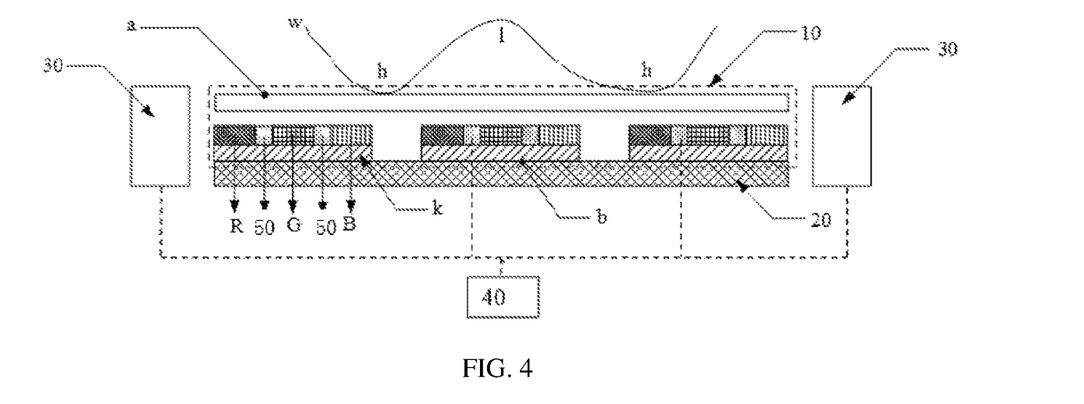
FIG. 4 is a structure diagram of a display device provided in an embodiment of the present disclosure.

FIG. 4 shows another embodiment. With reference to FIG. 4, the display panel 10 is further configured with infrared sensors 50 connected to the image processing device 40. In practical application, each pixel in the display panel 10 may include at least two sub-pixels spaced apart and the infrared sensor 50 may be disposed in the gap between two adjacent sub-pixels. For example, as illustrated in FIG. 4, the pixel x may include a red sub-pixel R, a green sub-pixel G and a blue sub-pixel B that are spaced apart; the gap between the red sub-pixel R and the green sub-pixel G of the pixel x has an infrared sensor 50 disposed therein and the gap between the green sub-pixel G and the blue sub-pixel B also has an infrared sensor 50 disposed therein.

During fingerprint recognition, the infrared light emitted by the infrared light source 20 can transmit through pixel gaps j and impinge through the display surface a of the display panel 10 on the fingerprint w to be recognized including fingerprint valleys 1 and fingerprint ridges h, both of which can reflect the infrared light impinging on the fingerprint w to be recognized. The infrared sensors 50 can detect the intensities of the infrared light reflected by the fingerprint valleys 1 and by the fingerprint ridges h of the fingerprint w to be recognized and send the detected intensities to the image processing device. The image processing device can obtain the intensities of the infrared light reflected by the fingerprint w to be recognized that have been detected by the infrared sensors 50 and recognize the fingerprint w to be recognized in accordance with the light intensities. In particular, there is less air between fingerprint ridges h and the display surface a of the display panel 10, so the intensity of the infrared light reflected by the fingerprint ridges is higher, while there is more air between fingerprint valleys 1 and the display surface a of the display panel 10, so the intensity of the infrared light reflected by the fingerprint valleys 1 is lower. As a result, the processing device can determine the area in which the infrared sensors 50 detecting higher light intensities are located as the area in which the fingerprint ridges h of the fingerprint w to be recognized are located, and determine the area in which the infrared sensors 50 detecting lower light intensities are located as the area in the fingerprint valleys 1 of the fingerprint w to be recognized are located, achieving recognition of the fingerprint w to be recognized.

Figure 5:
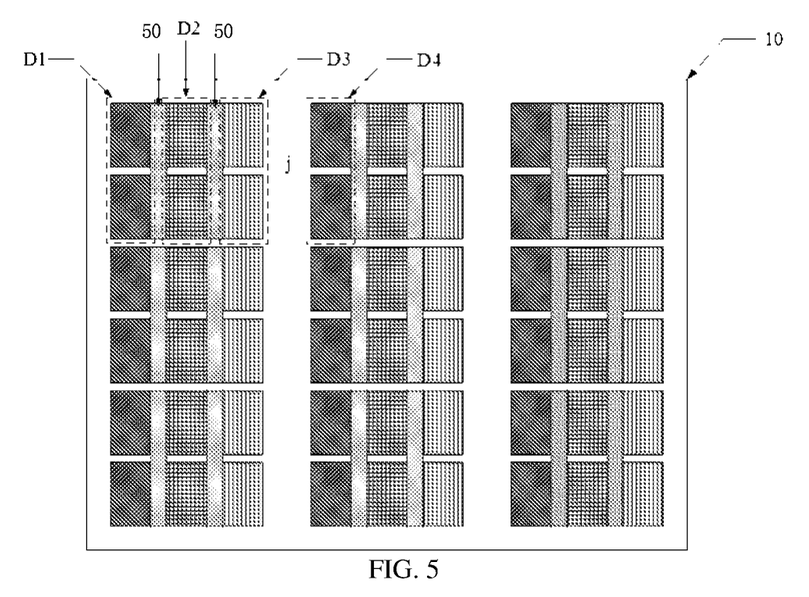
FIG. 5 is a top view of a display panel provided in an embodiment of the present disclosure.

Refer to FIG. 5, which shows a top view of the display panel 10 illustrated in FIG. 4. As illustrated in FIG. 5, the display panel 10 may have a plurality of infrared sensors 50 disposed therein. Each infrared sensor 50 is located between every two adjacent groups of sub-pixels other than in any pixel gap j, and each group of sub-pixels includes at least two sub-pixels arranged in the row direction. For example, as illustrated in FIG. 5, the group of sub-pixels D1 includes two red sub-pixels arranged in the row direction, the group of sub-pixels D2 includes two green sub-pixels arranged in the row direction, the group of sub-pixels D3 includes two blue sub-pixels arranged in the row direction, and the group of sub-pixels D4 includes two red sub-pixels arranged in the row direction. It can be seen from FIG. 5 that the gaps between the group of sub-pixels D1 and the group of sub-pixels D2 and between the group of sub-pixels D2 and the group of sub-pixels D3 are not pixel gaps j, while the gap between the group of sub-pixels D3 and the group of sub-pixels D4 is a pixel gap j; as a result infrared sensors 50 are disposed in the gaps between the group of sub-pixels D1 and the group of sub-pixels D2 and between the group of sub-pixels D2 and the group of sub-pixels D3.

In contrast to the configuration in which infrared sensors 50 are disposed in the gaps between adjacent sub-pixels, in the configuration in which each infrared sensors 50 is disposed between every two adjacent groups of sub-pixels other than in any pixel gap j, the infrared sensor 50 can have a relatively large lengthwise size, so the photosensitive area of the display panel 10 and in turn the accuracy of recognition of the fingerprint w to be recognized are increased.

In practical application, the display device in the above-mentioned embodiment may further include a housing containing the display panel and the above-mentioned image processing device may include a processor and/or a processing chip, a memory for storing instructions and data, and the like.

In summary, the gestures of a user can be recognized and in turn gesture control can be achieved for the display device provided in embodiments of the present disclosure by disposing an infrared light source, at least one camera device and an image processing device in the display device; the infrared light source may be disposed on one side of the display device on which the self-luminous display panel is located, so the gesture recognition device in the display device may be partially integrated with the display panel of the display device, leading to a reduced volume of the display device.

At least one embodiment of the present disclosure further provides a self-luminous display panel, which has a structure using the same principle as that of the display panel 10 described above and includes a base substrate, a plurality of light shading blocks, and a plurality of pixels. The plurality of light shading blocks are in one to one correspondence with the plurality of pixels, there are transmissive pixel gaps between the plurality of pixels, the plurality of light shading blocks are arranged in an array on the base substrate, each pixel is positioned on a corresponding light shading block and the normal projection of each pixel on the base substrate is covered by its corresponding light shading block.

Furthermore, in an embodiment of the present disclosure, each pixel includes at least two sub-pixels spaced apart, a plurality of infrared sensors are disposed in the display panel, each infrared sensor is located between every two adjacent groups of sub-pixels other than in any pixel gap, and each group of sub-pixels includes at least two sub-pixels arranged in the row direction.

Figure 6:
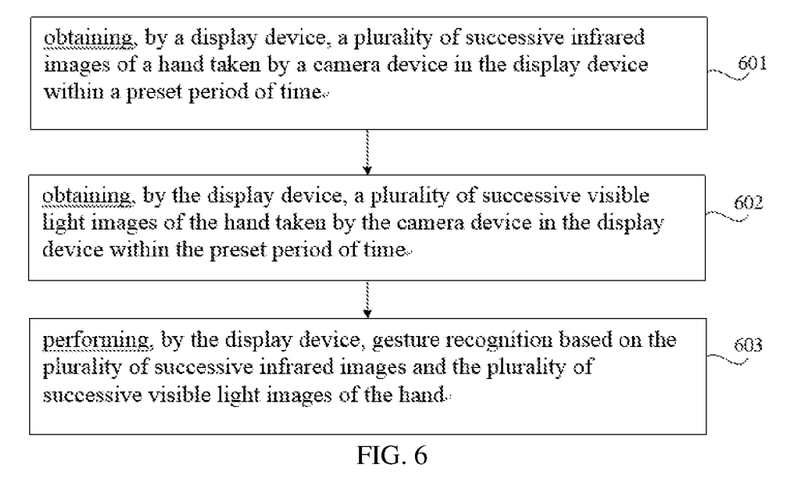
FIG. 6 is a flow chart of a gesture recognition method provided in an embodiment of the present disclosure.

At least one embodiment of the present disclosure further provides a gesture recognition method that can be applied to the display device provided in the embodiments described above. As illustrated in FIG. 6, the gesture recognition method may include the following steps.

In step 601, the display device obtains a plurality of successive infrared images of a hand that are taken by at least one camera device in the display device within a preset period of time.

In step 602, the display device obtains a plurality of successive visible light images of the hand that are taken by the camera device in the display device within the preset period of time.

In step 603, the display device performs gesture recognition based on the plurality of successive infrared images and the plurality of successive visible light images of the hand.

In an embodiment of the present disclosure, the step 603 may be implemented as the following operations:

A. determining, by the display device, the variation of distortion degree, within the preset period of time, of an optical pattern formed by projection of the infrared light source of the display device on the hand in accordance with the plurality of successive infrared images of the hand;

B. determining, by the display device, the movement trajectory of the hand in the direction perpendicular to the reference plane within the preset period of time in accordance with the variation of distortion degree, wherein when the display panel is a flat display panel, the reference plane is the display surface, while when the display panel is a cured display panel, the reference plane is a plane in which the chord corresponding to the generatrix of the display surface is located;

C. determining, by the display device, the movement trajectory of the hand in the direction parallel with the reference plane within the preset period of time in accordance with the plurality of successive visible light images; and D. performing, by the display device, gesture recognition in accordance with the movement trajectory of the hand in the direction perpendicular to the reference plane and the movement trajectory of the hand in the direction parallel with the reference plane.

The specific technical process of the gesture recognition method provided in the embodiment of the present disclosure has been described in detail in the embodiments of the display device described above and will no longer be repeated.

In an exemplary embodiment, there is provided a computer readable storage medium having computer programs stored therein, which, when executed by a processor, can perform a gesture recognition method, for example, including: obtaining a plurality of successive infrared images of a hand that are taken by a camera device in a display device within a preset period of time; obtaining a plurality of successive visible light images of the hand that are taken by the camera device in the display device within the preset period of time; and performing gesture recognition based on the plurality of successive infrared images and the plurality of successive visible light images of the hand.

In practical application, the display device provided in embodiments of the present disclosure may be an application terminal.

Figure 7:
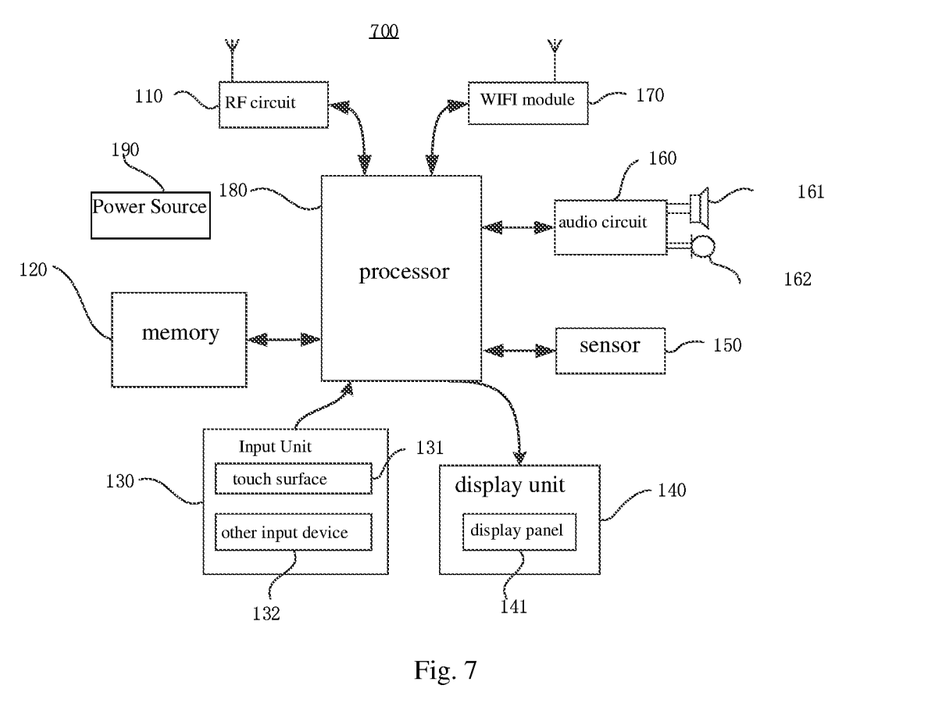
FIG. 7 is a structure diagram of a terminal provided in an embodiment of the present disclosure.

As illustrated in FIG. 7, the terminal 700 includes a Radio Frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, a power supply 190 and so on.

It can be appreciated by those skilled in the art that the terminal is not limited to the structure of the terminal illustrated in FIG. 7 and may include more or less components, some combinations of the components or different arrangement of the components. The RF circuit 110 can be used to receive and send signals during reception and transmission of information or during a call. In particular, the RF circuit 110 sends the received downlink information to one or more processors 180 for processing and in addition sends the uplink data to the base station. Typically, the RF circuit 110 includes, but not limited to, antennae, at least one amplifier, a tuner, one or more of oscillators, a subscriber identification module (SIM) card, a transceiver, a coupler, a Low Noise Amplifier (LNA), a diplexer and the like. Furthermore, the RF circuit 110 may also communicate with networks or other equipments via wireless communication. The wireless communication may use any communication standard or protocol including, but not limited to, Global System of Mobile communication (GSM), General Packet Radio Service (GPRS), Code Division Multiple Access (CDMA), Wideband Code Division Multiple Access (WCDMA), Long Term Evolution (LTE), E-Mail, Short Messaging Service (SMS) or any other standard or protocol.

The memory 120 may be used to store software programs and modules, which are executed by the processor 180 to perform various functional applications and data processing. The memory 120 may mainly include a program storage area and a data storage area. The program storage area may store an operating system, application programs required by at least one functions (such as audio playback, video playback or the like) or the like, while the data storage area may store data (such as audio data, telephone book or the like) created in accordance with use of the terminal 700. Furthermore, the memory 120 may include a high-speed random access memory, a non-volatile storage (e.g., at least one disk storage device), a flash memory device or a volatile solid storage device. Accordingly, the memory 120 may further include a memory controller to provide the processor 180 and the input unit 130 with access to the memory 120.

The input unit 130 can be used to receive input number or character information and generate keyboard, mouse, joystick, optical or trackball signal input related to user setting and function control. In particular, the input unit 130 may include a touch sensitive surface 131 and another input device 132. The touch sensitive surface 131, also known as a touch display screen or a touch pad, can collect touch operations thereon by the user (e.g., operations on or near the touch sensitive surface 131 by the user using his finger(s), a touch pen or any other suitable object or accessory), and drive corresponding connected devices in accordance with a predefined program. Optionally, the touch sensitive surface 131 may include two parts, i.e., a touch detection device and a touch controller. The touch detection device detects the orientation and position of the touch operation by a user, detects signals caused by touch operations and sends the signals to the touch controller; the touch controller receives touch information from the touch detection device, converts the touch information into touch co-ordinates, and sends the touch co-ordinates to the processor 180, as well as receives and executes commands from the processor 180. Furthermore, the touch sensitive surface 131 may be implemented to be a resistive, capacitive, infrared, surface acoustic wave or any other type of touch sensitive surface. In addition to the touch surface 131, the input unit 130 may further include another input device 132. Specifically, the input device 132 may include, but not limited to, one or more of a physical keyboard, a functional button (such as a volume control key, a switch key and the like), a track ball, a mouse, a joystick and the like.

The display unit 140 may be used to display the information input by the user or provided to the user, and various graphic user interfaces of the terminal 700, which may be composed by graphics, texts, icons, videos and any combination thereof. The display unit 140 may include a display panel 141, which may be optionally configured as a Liquid Crystal Display (LCD), an Organic Light-Emitting Diode (OLED) display, or any other type of display panel. Furthermore, the touch sensitive surface 131 may cover the display panel 141. Upon detecting a touch operation on or near the touch sensitive surface, the touch sensitive surface 131 transmits the operation to the processor 180, which determines the type of the touch event and then provides corresponding visual output on the display panel 141 in accordance with the touch event. Although, as illustrated in FIG. 7, the touch sensitive surface 131 and the display panel 141 are two independent components to provide the input and output functions, and in some embodiments they may be integrated into one component to provide both the input function and the output function.

The terminal 700 may further include at least one sensor 150, such as an optical sensor, a motion sensor or any other sensor. Specifically, the optical sensor may include an ambient light sensor to regulate the brightness of the display panel 141 in accordance with ambient light and a proximity sensor to turn off the display panel 141 and/or the backlight when the terminal 700 is moved close to the user's ear. As one type of motion sensor, a gravity acceleration sensor can detect the magnitudes of acceleration in various directions (generally those of three axes), can detect the magnitude and direction of gravity when the sensor is at rest, and can be used for applications related to recognition of posture of a cellphone (such as switching between the horizontal screen and the vertical screen, related games, posture calibration using a magnetometer), functions related to recognition of vibration (such as a Pedometer, tapping) or the like; the terminal 700 may be further configured with a gyroscope, an air gauge, a thermometer, an infrared sensor or any other sensor, which will not be described in detail herein.

The audio interface between the user and the terminal 700 can be provided by an audio circuit 160, a speaker 161 and a microphone 162. The audio circuit 160 may receive audio data, convert the received audio data into electrical signals, send the signals to the speaker 161, which converts the electrical signals into sound signals and outputs the sound signals; on the other hand, the microphone 162 collects sound signals and converts them into electrical signals, which are received and converted into audio data by the audio circuit 160 and output to the processor 180, and the audio data is sent to another terminal after being processed by the processor 180 via the RF circuit 110 or output to the memory 120 for further processing. The audio circuit 160 may further include an earplug jack to provide communication between a peripheral earphone and the terminal 700.

WiFi is a technology for short range wireless transmission. Utilizing the WiFi module 170, the terminal 700 can facilitate the user to receive and send e-mails, brow web pages, access streamed media or the like, providing the user with wideband wireless access to Internet. Although FIG. 7 shows the WiFi module 170, it can be appreciated that it is not an essential component of the terminal 700 and may be just omitted as necessary without departing from the spirit and scope of the present disclosure.

As the control center of the terminal 700, the processor 180 connects with various components of the whole cellphone by means of various interfaces and wiring connections, performs various functions of the terminal 700 and processes data by running or executing software programs and/or modules stored in the memory 120 and calling the data stored in the memory 120 so as to perform overall monitoring on the cellphone. Optionally, the processor 180 may include one or more processing cores; optionally, the processor 180 may have an application processor and a modulation/demodulation processor integrated therein; the application processor mainly processes an operating system, user interfaces, application programs and the like, and the modulation/demodulation processor mainly processes wireless communication. It is appreciated that the modulation/demodulation processor may be not integrated into the processor 180.

The terminal 700 may further include a power supply 190 (e.g., a battery) to supply power for the components and optionally the power supply may be logically connected to the processor 180 via a power management system, so charging, discharging, management of power consumption or any other function can be achieved via the power management system. The power supply 190 may further include one or more DC or AC power supplies, a recharging system, a power failure detection circuit, a power supply switching device, a power supply status indicator or any other arbitrary component.

Although not shown, the terminal 700 may further include a camera, a Bluetooth module and the like, which will not be described in detail herein.

What are described above is related to the illustrative embodiments of the disclosure only and not limitative to the scope of the disclosure; the scopes of the disclosure are defined by the accompanying claims.

What is claimed is:

1. A display device comprising a self-luminous display panel, an infrared light source, at least one camera device, and an image processing device,
   wherein the display panel has a display surface and a non-display surface that are parallel to each other, the infrared light source is disposed on a side of the display panel on which the non-display surface is located, the light emitting surface of the infrared light source is directed to a side of the display panel on which the display surface is located, and the display panel has a transmissive area for transmission of infrared light;
   the at least one camera device is directed to the side of the display panel on which the display surface is located, and configured to acquire infrared images and visible light images; and
   the image processing device is coupled to the at least one camera device and configured to perform gesture recognition based on a plurality of successive infrared images and a plurality of successive visible light images of an operation body taken within a same period of time.

2. The display device of claim 1, wherein the at least one camera device is located around the display panel or on the non-display area of the display panel, and
   the at least one camera device comprises an infrared camera and a visible light camera, which are configured to take a plurality of successive infrared images and a plurality of successive visible light images of the operation body, respectively.

3. The display device of claim 2, wherein the display device comprises a plurality of camera device, the display panel has a rectangular shape, and each of four corners of the display panel has one infrared camera and one visible light camera disposed thereon.

4. The display device of claim 1, wherein the display panel comprises infrared sensors connected with the image processing device; and
   the image processing device is further configured to obtain intensities, which is detected by the infrared sensors, of the infrared light reflected by a fingerprint to be recognized, and performs recognition on the fingerprint to be recognized based on the intensities.

5. The display device of claim 4, wherein the display panel comprises a plurality of pixels arranged in an array and the transmissive area is constituted by pixel gaps between the plurality of pixels with each pixel comprising at least two sub-pixels spaced apart; and
   a plurality of infrared sensors are disposed in the display panel with each infrared sensor being located between every two adjacent groups of sub-pixels other than in any pixel gap, and each group of sub-pixels comprises at least two sub-pixels arranged in a row direction.

6. The display device of claim 1, wherein the display panel comprises a plurality of pixels arranged in an array and a plurality of light shading blocks arranged in an array on the non-display surface.

7. The display device of claim 6, wherein the plurality of light shading blocks are in one to one correspondence with the plurality of pixels, and each of the light shading blocks covers a normal projection area of a corresponding pixel on the non-display surface.

8. The display device of claim 1, wherein the infrared light emitted by the infrared light source forms a reticular optical pattern constituted by transverse stripe optical patterns and longitudinal stripe optical patterns crossing each other on a plane parallel to the display surface of the display panel after being transmitted through the display surface.

9. The display device of claim 1, wherein the display panel comprises a plurality of pixels arranged in an array and the transmissive area is constituted by pixel gaps between the plurality of pixels, and the display device further comprises light ray collimators disposed in the pixel gaps to collimate the infrared light emitted from the infrared light source.

10. A gesture recognition method comprising:

obtaining a plurality of successive infrared images of an operation body that are taken within a preset period of time by a camera device in a display device;

obtaining a plurality of successive visible light images of the operation body that are taken within the preset period of time by the camera device in the display device; and performing gesture recognition based on the plurality of successive infrared images and the plurality of successive visible light images of the operation body;

wherein performing gesture recognition based on the plurality of successive infrared images and the plurality of successive visible light images of the operation body comprises:

determining a variation of distortion degree, within the preset period of time, of an optical pattern formed by projection of an infrared light source of the display device on the operation body in accordance with the plurality of successive infrared images of the operation body;

determining a movement trajectory of the operation body in a direction perpendicular to a reference plane within the preset period of time in accordance with the variation of distortion degree of the optical pattern, wherein where the display panel is a flat display panel, the reference plane is a display surface, while where the display panel is a curved display panel, the reference plane is a plane in which a chord corresponding to a generatrix of the display surface is located;

determining the movement trajectory of the operation body in a direction parallel to the reference plane within the preset period of time in accordance with the plurality of successive visible light images of the operation body; and performing gesture recognition in accordance with the movement trajectory in a direction perpendicular to the reference plane and the movement trajectory in the direction parallel to the reference plane of the operation body.

11. A gesture recognition device comprising a processor, a memory and one or more computer program modules, wherein the one or more computer program modules are stored in the memory and configured to be executed by the processor, and comprise instructions, when executed, implementing the gesture recognition method of claim 10.

12. A storage medium used for non-transitory storage of computer readable instructions, wherein the non-transitory computer readable instructions can perform the gesture recognition method of claim 10 when executed by a computer.

13. A self-luminous display panel comprising a base substrate, a plurality of light shading blocks and a plurality of pixels, wherein the plurality of light shading blocks are arranged in an array on the base substrate and in one to one correspondence with the plurality of pixels;

transmissive pixel gaps are between the plurality of pixels; and each of the pixels is disposed on a corresponding light shading block which covers a normal projection of the pixel on the base substrate;

wherein each of the pixels comprises at least two sub-pixels spaced apart;

the display panel has a plurality of infrared sensors disposed therein; and each of the infrared sensors is located between every two adjacent groups of sub-pixels other than any pixel gap, and each group of sub-pixels comprises at least two sub-pixels arranged in a row direction.

* * * * *